Carl W. Zimmerman
INVENTOR.

BY *D. Carl Richards*
AGENT

Dec. 30, 1952     C. W. ZIMMERMAN     2,623,923
ELECTROSTATICALLY SHIELDED MAGNETIC WELL LOGGING SYSTEM
Filed April 23, 1951                               2 SHEETS—SHEET 2

CARL W. ZIMMERMAN
INVENTOR.

BY D. Carl Richards
AGENT

UNITED STATES PATENT OFFICE 2,623,923

ELECTROSTATICALLY SHIELDED MAGNETIC WELL LOGGING SYSTEM

Carl W. Zimmerman, Dallas, Tex., assignor, by mesne assignments, to Schlumberger Well Surveying Corporation, Houston, Tex., a corporation of Delaware Application April 23, 1951, Serial No. 222,362

10 Claims. (Cl. 175—182)

This invention relates to logging a well bore and more particularly to an improvement in the coupling between formations adjacent a well bore and a measuring system.

This application is a continuation in part of my copending application Serial No. 165,971, filed June 3, 1950, for an "Electrostatically Shielded Magnetic Well Logging System."

Electrostatically coupled effects have been found to introduce ambiguities in induction well logging where a solenoid is electromagnetically coupled to earth formations and is utilized as one element of a system for detecting variations in the magnetic and resistive properties of the formations along the length of a well bore. Formations adjacent such a solenoid, from the standpoint of an equivalent electrical circuit, form the secondary winding of a magnetically coupled system such as a transformer in which the solenoid itself is the primary winding. Variations in the character of the formations will be reflected as impedance and/or voltage changes in the winding of the solenoid. The reflected impedance changes have characteristics both resistive and reactive and may be separated into the separate components for study and interpretation of the character of the formations which produced such changes.

It has been found that upon passing such a sensitive element through various earth strata the variations in the dielectric properties of media such as fluid in a well bore or the formations adjacent thereto may result in the production of an impedance change as viewed from the terminals of the solenoid that are not directly associated with the properties under study. For example, if the system passes from an open section of a bore hole to a deeper section filled with water or drilling mud, an impedance changes opposite in sense to that produced by formations of increasing magnetic permeability will be experienced. This is for the reason that water having a high dielectric constant modifies the solenoid impedance.

It is an object of the present invention to provide an improvement in logging systems wherein the formations adjacent a well bore are electromagnetically coupled to a sensitive measuring system by substantial elimination of electrostatic coupling.

It is a further object of this invention to provide an exploring system in which a solenoid winding is coupled into a detecting bridge circuit in such a manner as to provide a minimum of electrostatic coupling to the formations and more particularly in which an electrostatic shield for the solenoid winding prevents electrostatic coupling to the formations without interfering with the electromagnetic coupling.

In accordance with the present invention and in accordance with a preferred form thereof, there is provided an improvement in systems for electromagnetically exploring formations adjacent a well bore in which a bridge network having an output diagonal is excited by alternating current applied to an input diagonal. An elongated core of magnetic material is supported for movement with the bridge network through the well bore with a single winding on the core. A sheath preferably extending along said core and at or outside the periphery of said winding at least equal in length to the axial length of the winding is connected to one extremity of the output diagonal of the bridge network and to ground. Changes in the dielectric properties of a media adjacent the solenoid are effectively shielded by maintaining a conductive sheath around the winding substantially at the potential of the media in which the solenoid is disposed.

For a more detailed explanation of the invention and for further objects and advantages thereof reference may now be had to the following description taken in conjunction with the accompanying drawings in which, Fig. 1 is a schematic diagram of a well logging system embodying the present invention;

Figure 1:
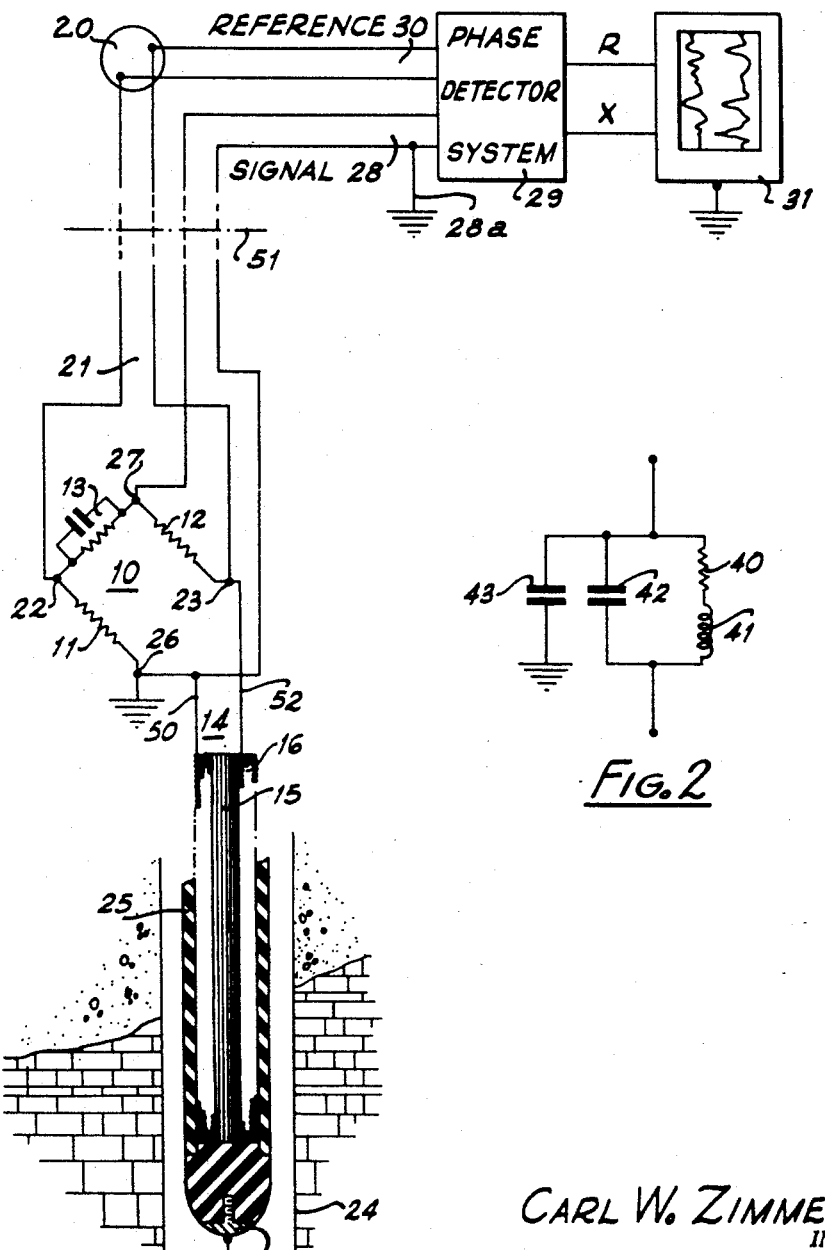

Referring now to Fig. 1 there is illustrated a balanceable bridge network 10 in which resistors 11 and 12 form opposed arms and the resistance-capacitance circuit 13 forms a third intermediate arm. The fourth arm of the bridge network is formed, for example, as shown by the patent No. 2,535,666 to Robert A. Broding, by an elongated exploring solenoid 14 through which the formations are coupled to the bridge network.

In accordance with the present invention the elongated solenoid 14 is so constructed and operated as to eliminate the effect of variations in the dielectric properties of the formations adjacent thereto and of the fluids found in the bore hole. In a preferred form of the invention the solenoid 14, Fig. 1, comprises an elongated core 15 preferably of annealed, highly permeable non-retentive magnetic laminations. A single winding 16 formed preferably by a plurality of layers of insulated copper wire is formed to inclose the laminations 15. The winding 16 forms single continuous path for flow of current from the bridge network 10. When the bridge network 10 is excited from a source 20 by way of conductors 21 which are connected to an input diagonal having terminals 22 and 23, the electromagnetic field effectively couples the formations to the bridge network.

In accordance with the Broding patent, the signal produced across the output diagonal having ground terminal 26 and high potential terminal 27 is applied by way of a circuit 28 to a phase detecting system 29. A reference voltage is also applied to the phase detecting circuit 29 from the excitation source 20 by way of a circuit 30. By phase detecting the signal on conductors 28, two components are produced, a resistive component (R) and a reactive component (X) which may then be applied to a recording device 31 to produce a chart of variations in the resistive and magnetic properties of the well bore 24 as a function of the depth of the solenoid 14 in the well bore.

The frequency of the bridge excitation signal from source 20 is relatively low, preferably in the audio range. In such case, the magnetic properties of the formations predominantly determine the reactive component (X) as detected by the system 29. However, it has been found that variations in the dielectric properties of the formations and particularly of fluids in the well bore produce an effect opposite in sense to that produced by the magnetic properties of the formations and thus introduces a factor into the recording system that is independent of the properties under study.

Figure 2:
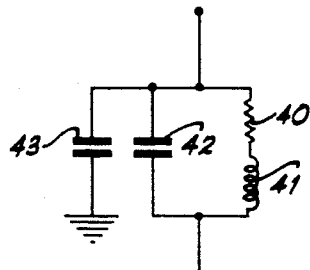
Fig. 2 is an equivalent circuit for the solenoid of Fig. 1.

With reference to Fig. 2 the reason for such error may be understood. Fig. 2 illustrates the equivalent circuit of solenoid 14 in which the resistance 40 represents the resistance of the winding 16. The inductance 41 represents the inductance of the winding 16. The condenser or capacitance 42 represents the distributed capacitance between the turns of the winding 16. When solenoid 14 passes from an open hole section to a water filled section of the bore hole, the presence of water having a high dielectric constant produces a change in the magnitude of the condenser 42, Fig. 2. A shift in the reactive component is thus produced apparent on the record although entirely independent of any property of the formation.

The second condenser 43 represents the capacitance between the winding 16 and the wall of the bore hole 24 which by definition is at ground potential. The air in an open section of the bore hole and the liquid media in fluid filled sections of the bore hole form the dielectric of condenser 43. The variation in this condenser along with variations in condenser 42 produce such changes in going from an open section to a liquid filled section of bore hole that variations in the resistive or magnetic properties of the formations are comparatively insignificant.

In avoidance of such undesirable effects applicant provides, in one form of the invention, a particular construction of solenoid which, when connected in the bridge network with a portion of the winding substantially ground potential, is electrostatically shielded. More particularly, in the preferred form of the invention, the winding 16 is a multilayered coil having first a terminal associated with the inner layer and its second terminal associated with the outer layer. The terminal associated with the outer layer is connected by way of conductor 50 to terminal 26 at the output diagonal of the bridge network 10. Additionally, terminal 26 is connected to an electrical ground.

In practice it will be found necessary to maintain the electrical ground connection at the surface of the earth, for example, as by the ground connection 28a since when the exploring solenoid is in a section of bore hole free of water a positive ground between the exploring instrument and the walls of the bore hole is difficult to maintain. It is to be understood that the bridge network 10 together with the solenoid 14 will be encased in a housing 25, only the lower portion of which is shown in Fig. 1, and which lower portion is of a non-magnetic non-conducting material. It will be found desirable in addition to maintaining the ground 28a to maintain a second ground at the lower end of the casing, such a grounding indicated by the metallic button carried by the lower end of the housing 25. This metallic button is electrically common to the terminal 26 of the bridge network 10 though the connecting conductor is not shown. Thus, when the housing enters a water filled section of bore hole, there is immediately established a ground connection so that the terminal 26 of the bridge network is maintained at the same potential level as the bore hole fluid.

The second terminal of the solenoid 14, associated with the inner layer, is connected to one end of the input diagonal as by conductor 52 connected to the input terminal 23. With this circuit arrangement the outer layer of the winding 16 forming but a portion of the impedance of the coil is maintained at a low potential, substantially at ground potential, and serves as an electrostatic shield for the remaining layers of the winding.

The degree of electrostatic shielding provided by the outer layer of the coil 16 depends upon the coil construction. The impedance of an inductance coil of this type is roughly proportional to the square of the number of turns. If the solenoid is constructed with two layers uniformly wound on the core 15, the dielectric effects electrostatically coupled to the solenoid will be reduced by a factor of approximately four when the terminal at the outer layer is maintained at ground potential. Similarly, if a uniformly wound three-layer coil is used, the dielectric effects will be reduced by a factor of approximately nine. However, even in a two-layer case the effects may further be reduced by space winding the outer layer, i. e., by forming a relatively wide angle helix. With such construction there is a relatively small proportion of the solenoid impedance in the outer layer but even so the outer layer forms an effective electrostatic shield for uniformly wound inner layers and presents an equal potential barrier around the solenoid. However, it has been found that uniformly wound two-layer coils are sufficiently shielded from dielectric variations to permit logging in formations ordinarily encountered. If unusual circumstances are encountered, a multi-layered coil or a space wound outer layered two-layer coil may be required.

Thus, in accordance with this form of the invention, a portion of the winding of the solenoid is maintained at substantially ground potential in so far as the associating bridge network is concerned, and shields the remaining portion of the coil from electrostatic effects while providing at least in part the electromagnetic coupling of the coil to the adjacent formation.

Figure 3:
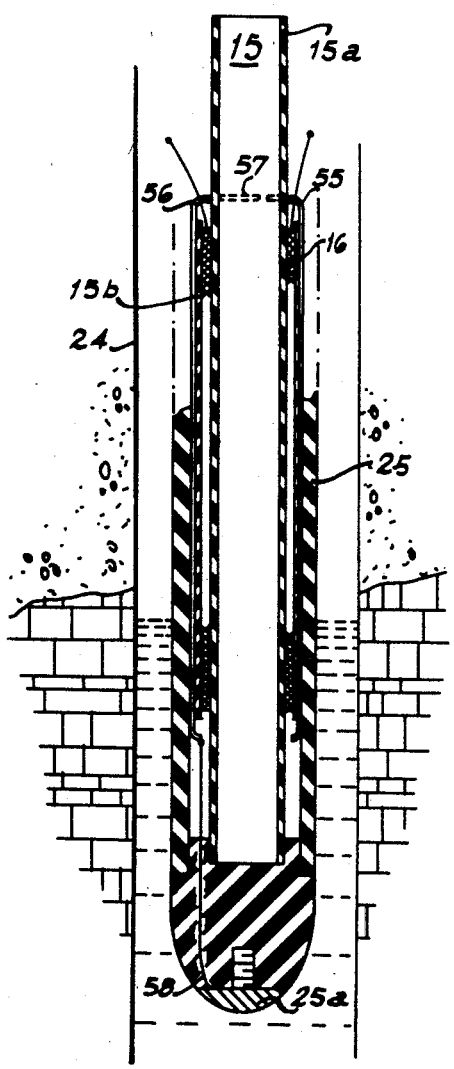
Fig. 3 illustrates a modified form of the present invention.

Referring now to Fig. 3, there is illustrated a modification of a coil structure. Where consistent, parts have been given the same reference characters as in Fig. 1. In this system the winding 16, shown cross-hatched, is supported on an insulating cylinder 15a which is placed around the core 15 of the solenoid. A second insulating cylinder 15b forms an insulating sheath around the coil or winding 16. The core 15 extends beyond both ends of the winding 16, as explained in the above identified Broding patent, to prevent extremely high concentrations of magnetic flux immediately adjacent the ends of the coil 16. A plurality of elongated conductors are then disposed about the periphery of the coil 16 and extend longitudinally of the coil with their axes parallel to the axis of the core 15. The conductors, two of which, the conductors 55 and 56, are shown in Fig. 3, are all open circuited at the lower ends of the winding. However, they are electrically common at their upper ends, each being connected to a split-ring conductor 57. Further, as shown, they are connected to the ground button 25a through conductor 56 and conductor 58. The conducting ring 57 is not continuous but rather is open at point 60, Fig. 4, so that there will not be a short circuited conductor coupled to the coil 16.

Figure 4:
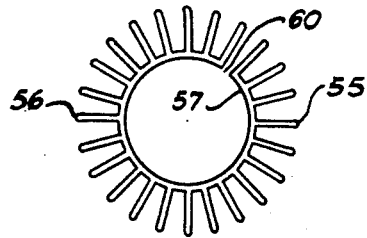
Fig. 4 is an end view of the shield of Fig. 3.
Figure 5:
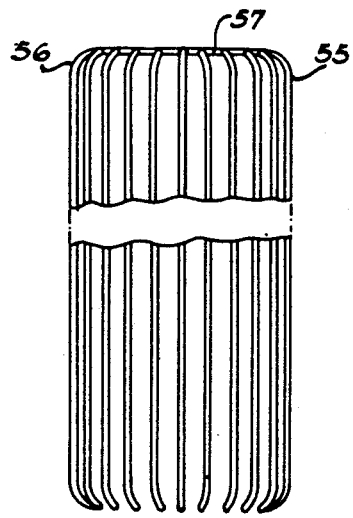
Fig. 5 is a side view of the shield.

The construction of the electrostatic shield formed by conductors 55 and 56 and others is more clearly illustrated in Figs. 4 and 5. The elongated conductors, including conductors 55 and 56, extend downwardly from the split ring conductor 57. It will be apparent that since conductors 55 and 56 are open at one end there can be no current flow therein due to magnetic coupling to the coil. Stated otherwise, there are no closed loops for current flow. At the same time, however, conductors 55 and 56 along with the remaining similar conductors form an equal potential barrier completely enclosing the winding 16. This barrier, maintained at ground potential, prevents electrostatic coupling of the formations or bore hole liquids to the coil.

Thus, in accordance with this modification of the invention there is provided an elongated magnetic core having a winding disposed centrally thereof for providing coupling to the formations adjacent a well bore in which the system is to operate upon current flow therethrough. The electrostatic shield maintained at ground potential and enclosing the winding of the solenoid prevents introduction of unwanted signals electrostatic in nature while permitting the desired electromagnetic coupling.

The modifications of the invention illustrated by Figs. 1 and 3 both will be found suitable for providing the requisite shielding. However, the system of Fig. 1 is preferred since there is eliminated the necessity of a separate shielding structure. The outer winding of the coil 16, Fig. 1, maintained substantially at ground potential, performs the double function of shielding and aiding in the establishment of the electromagnetic coupling to the formations. In either case, however, it is necessary to maintain a conducting ground terminal at the surface of the earth.

Having thus described the invention, it is to be understood that the description has been given by way of illustration and example only and not by way of limitation, reference for the latter purpose being had to the appended claims.

What is claimed is:

1. In a system for electromagnetically exploring formations adjacent a well bore which includes a bridge network having output terminals at a first diagonal and excited from an alternating current source connected to input terminals at a second diagonal, the combination therewith which comprises an elongated inductance forming one arm of said bridge network and mechanically supported for movement through said well bore, means forming a substantially equal potential barrier encompassing said coil, a fixed ground contact at the surface of the earth, and a low resistance conducting path interconnecting said ground contact, the bridge output terminal adjacent said arm of said bridge network, and said potential barrier to maintain said barrier at the potential of media adjacent thereto.

2. The improvement in systems for electromagnetically exploring formations adjacent a well bore which include a bridge network having output terminals at a first diagonal and excited from an alternating current source connected to input terminals at a second diagonal, of an elongated solenoid having a plural layered winding connected in said bridge network with the terminal at the outer layer connected to a selected output terminal and mechanically supported for movement through said well bore, a fixed ground contact at the surface of the earth, and a low resistance conducting path interconnecting said ground contact and said selected bridge output terminal to maintain said outer layer at ground potential to form an electrostatic shield for the solenoid.

3. The improvement in systems for electromagnetically exploring formations adjacent a well bore which include a bridge network having output terminals at a first diagonal and excited from an alternating current source connected to input terminals at a second diagonal, of an elongated inductance forming one arm of said bridge network and mechanically supported for movement through said well bore, circularly disposed elongated conductors forming a cylindrical array around said coil, a fixed ground contact at the surface of the earth, and a low resistance conducting path extending from said surface into said well bore interconnecting said ground contact, the bridge output terminal adjacent said arm of said bridge network and each of said elongated conductors.

4. The improvement in systems for electromagnetically exploring formations adjacent a well bore which include an exploring unit supported from the earth's surface by cable means having associated therewith a bridge network with output terminals at a first diagonal and excited from an alternating current source connected to input terminals at a second diagonal, of an elongated inductance forming one arm of said bridge network and mechanically supported with said unit for movement through said well bore, a barrier encompassing said coil electrically conductive in the direction of the axis of said inductance and nonconductive in directions normal thereto, a fixed ground contact at the surface of the earth, and a low resistance conducting path in said cable means interconnecting said ground contact, the bridge output terminal adjacent said arm, and said barrier to maintain said barrier at the potential of media adjacent thereto electrostatically to shield said inductance.

5. The improvement in systems for electromagnetically exploring formations adjacent a well bore which include an exploring unit supported from the earth surface by a cable having associated therewith a bridge network with output terminals at a first diagonal and excited by alternating current applied to input terminals at a second diagonal, of an elongated magnetic core mechanically supported for movement with said unit through said well bore, a coil formed by a plurality of layers wound on said core connected in said bridge network as to form one arm thereof with the terminal at the outer layer connected to the bridge output terminal adjacent said arm, a fixed ground contact at the surface of the earth, and a low resistance conducting path in said cable interconnecting said ground contact and said bridge output terminal adjacent said arm to maintain said outer layer substantially at the potential of media adjacent thereto electrostatically to shield the remainder of said winding.

6. The improvement in systems for electromagnetically exploring formations adjacent a well bore which include a bridge network having output terminals at a first diagonal excited by alternating current applied to input terminals at a second diagonal, of an inductance coil connected in said bridge to form one arm thereof and mechanically supported with said unit in said bore hole for electromagnetically coupling said formations to said unit upon flow of current therethrough from said alternating current source, a ground contact at the surface of the earth, a sheath of spaced apart conductive elements non-conductive in planes normal to the axis of said inductance coil, and conducting means interconnecting said ground contact, the bridge output terminal adjacent said arm of said bridge, and said sheath to maintain said sheath at the potential of media adjacent said coil electrostatically to shield said coil from said media.

7. The improvement in systems for electromagnetically exploring formations adjacent a well bore which include an exploring unit supported from the earth surface by a cable having associated therewith a bridge network with output terminals in a first diagonal and excited by alternating current applied to input terminals at a second diagonal, of an elongated magnetic core magnetically supported for movement with said unit through said well bore, a coil formed by a plurality of layers wound on said core with the inner layers uniformly wound on said core and the outer layer helically wound over said inner layers, circuit means for connecting said coil in one arm of said bridge network with the terminal at said outer layer connected to the output terminal adjacent said arm, a fixed ground contact at the surface of the earth, and a low resistance conducting path in said cable interconnecting said ground contact, and said bridge output terminal adjacent said arm to maintain said outer layer substantially at the potential of media adjacent thereto electrostatically to shield the remainder of said winding.

8. In a bridge network having output terminals at a first diagonal and exciting alternating current applied to input terminals at a second diagonal, an elongated inductance forming one arm of said bridge network, a barrier electrically conductive in the direction of the axis of said inductance and non-conductive in directions normal thereto and a grounding circuit interconnecting said barrier and the bridge output terminal adjacent said arm to maintain said barrier at ground potential electrostatically to shield said inductance.

9. In a bridge network having output terminals at a first diagonal and exciting alternating current applied to input terminals at a second diagonal, an elongated cylindrical core, a current path formed by a plurality of conductive layers wound on said core having a first terminal at the inner layer and a second terminal at the outer layer thereof, a circuit connecting said first terminal to one of said input terminals, a circuit for connecting the second terminal to one of said bridge output terminals whereby said coil forms the inductance arm of said Maxwell bridge network, and a grounding circuit connected to said second terminal whereby said outer layer electrostatically shields the inner layers of said coil in avoidance of production of electrostatically derived signals in said bridge network.

10. In a bridge network having output terminals at a first diagonal and exciting alternating current applied to input terminals at a second diagonal, an elongated cylindrical core, a coil formed by a plurality of layers the inner layers of which are uniformly wound on said core and the outer layer helically wound with adjacent conductors spaced apart over said inner layers, circuit means for connecting said coil in one arm of said bridge network with the terminal at said outer layer connected to the output terminal adjacent said arm, circuit means for connecting the terminal at said inner layer to an input terminal of said bridge network and a grounding circuit connected to said terminal at said outer layer for maintaining said helically wound outer layer substantially at ground potential electrostatically to shield the inner layers and eliminate bridge unbalance due to electrostatic coupling of said coil.

CARL W. ZIMMERMAN.

REFERENCES CITED

The following references are of record in the file of this patent:

UNITED STATES PATENTS

| Number | Name | Date |
|---|---|---|
| 2,535,666 | Broding | Dec. 26, 1950 |